United States Patent [19]

Ohta

[11] Patent Number: 4,597,637
[45] Date of Patent: Jul. 1, 1986

[54] COLOR OPTICAL PRINTER HEAD HAVING A LIQUID CRYSTAL LAYER

[75] Inventor: Takahiro Ohta, Kanagawa, Japan

[73] Assignee: Fuji Photo Film Co., Ltd., Kanagawa, Japan

[21] Appl. No.: 573,944

[22] Filed: Jan. 26, 1984

[30] Foreign Application Priority Data

Jan. 28, 1983 [JP] Japan ................... 58-11407

[51] Int. Cl.⁴ .................................. G02F 1/13
[52] U.S. Cl. ...................... 350/339 F; 350/339 R
[58] Field of Search .................. 350/339 R, 339 F

[56] References Cited

U.S. PATENT DOCUMENTS 4,006,968  2/1977  Ernstoff et al. ............... 350/339 F
4,410,887  10/1983  Stolov et al. ............... 350/339 F X Primary Examiner—John K. Corbin
Assistant Examiner—Richard E. Gallivan

[57] ABSTRACT

A color optical printer head which can prevent white light from leaking between the interstices between transparent electrodes arranged inside liquid crystal shutter arrays and which can also prevent mixture of colors, thereby improving color reproducibility. The color optical printer head is characterized in that a transparent electrode on either side of the liquid crystal shutter arrays is formed on color filter layers of different colors formed on a glass substrate.

13 Claims, 7 Drawing Figures

COLOR OPTICAL PRINTER HEAD HAVING A LIQUID CRYSTAL LAYER

BACKGROUND OF THE INVENTION

Liquid crystal elements are currently in wide use for digital display in electric calculators or wristwatches and the application of liquid crystal elements for dotmatrix display which can arbitrarily display arabic numerals, Kanji-characters, Kana-characters or picture images is now being studied. Many of those elements are for black-and-white display using TN (torsional nematic) type liquid crystals. FIGS. 1 (a) and (b) show the principle of the TN method. As shown in the figure, a nematic liquid crystal is interposed between two glass substrates 1, 2 and the molecules 5 of the liquid crystal have a long axis which is parallel to the substrate face but is distorted in orientation increasingly along the direction of thickness (at the time an electric field is not impressed, FIG. 1(a)). The torsion angle from one glass substrate 1 to the other substrate 2 is 90°. Before and after such liquid crystal cells are arranged polarizing plates 3, 4 which cross each other perpendicularly in polarization direction. When white light enters such a liquid crystal panel from behind, the light passes through a polarizing plate 3 to be polarized in one direction. When the light enters the liquid crystal, it propagates along said liquid crystal molecules 5 to be rotated in polarizing direction by 90°. The polarizing direction therefore coincides with the polarizing direction of the polarizing plate 4 which is positioned ahead and the light proceeds without being blocked to pass through the polarizing plate 4. When an electric field is impressed on said liquid crystal in the direction of thickness, the liquid crystal molecules 5 are aligned with the direction of electric field in the long axis thereof as shown in FIG. 1(b). If white light is made to enter said element from behind, the light passes through the plate 3 to be polarized in one direction and then propagates through the liquid crystal as it is. The direction of the polarized light is kept perpendicular to the polarizing direction of the plate 4 and hence blocked by the plate 4. The liquid crystal of the TN method is utilized as a display element by using such mechanism that the liquid crystal cell becomes opaque when an electric field is impressed while it becomes transparent when an electric field is not impressed. As most of the liquid crystal elements of the TN method, however, are used for black-and-white display by means of opaque-and-transparent elements, the demand for color display has been keenly felt as the use of liquid crystal elements is remarkably expanded. Color display will improve attraction, recognition and diversity of the display and further provides a wider field of vision for some methods.

There have been proposed color display methods by means of liquid crystals using various principles. Typical are the ECB method (electrically controlled birefringence) using the birefringence property of liquid crystals, the GH method (guest-host) which adds a bi-color element to the liquid crystal and the color TN method in which the elements of the aforementioned TN method are covered with a birefringence color filter or a bi-color filter. FIG. 2 shows the liquid crystal elements of the color TN method wherein multicolor display becomes possible by combining color filters of red, green and blue. More particularly, a nematic liquid crystal 12 is inserted between two parallel glass substrates 10, 11 and transparent electrodes 13, 14 in the form of a strip are vapor-deposited in a plural number on the inner faces of said glass substrates 10, 11 in a manner to cross each other perpendicularly. When electric voltage is applied to combinations of opposing faces of the transparent electrodes 13, 14, arbitrary patterns or matrices become displayable. Color filters of R, G, and B are formed on transparent electrodes 14 shown at the lower part in the figure or the transparent electrodes which are closer to the surface of the liquid crystal display element. The color filters are of color addition mixture and the color filter R transmits red light, the color filter G green light and the color filter B blue light. The reason why color filters R, G and B are provided at such a location is because a higher resolution can be obtained if color filters are located closer to transparent electrodes and because color deviation is less when viewed obliquely if they are provided in a shallow depth or on the electrode 13 rather than the electrode 14.

As a liquid crystal becomes opaque or transparent according to the principle described for FIG. 1, if a transmission display type is adapted, it can function as a shutter for light. There has recently been developed a liquid crystal printer head which utilizes such function of a liquid crystal for the shutter of a copying machine (refer to Nikkei Electronics, 1982, May 10, p. 90–p. 92). The liquid crystal shutter is constructed in such a manner that a fluorescent lamp is provided as a light source behind a liquid crystal shutter and the light controlled by the liquid crystal shutter is projected to a photosensitive drum via a focusing system. The liquid crystal shutter array comprises 2000 shutters arranged transversely in a zigzag pattern at the pitch of 100 $\mu$m and the performance thereof is reported to have the resolution of 10 lines/mm. Such optical printer head is comparable to a semiconductor laser printer in the quality of prints and yet the price is less expensive than a laser printer. For such advantages, the development of an optical printer head is much sought after but the technology still remains at the primitive stage of black-and-white display. The technology has only taken the first step toward the multicolor display.

This inventor repeatedly conducted experiments in order to utilize in practice the liquid crystal display elements for color as the liquid crystal shutter arrays for an optical printer for hard copies in color and found out the following critical points:

(1) How to make uniform the performance of liquid crystal devices in a picture element unit comprising each shutter. In other words, how to overcome the problem that if the deviation in optical properties as a shutter is adjusted by the thickness of the color filter in a unit, the distance between opposing transparent electrodes or the thickness of the liquid crystal becomes disperse, thereby making the performance as a shutter of a liquid crystal device in a picture element irregular.

(2) As the electric fields which are applied to the liquid crystal vary depending on the permittivity of the layers of the color filters R, G, and B, the operation becomes unstable.

(3) As the interface area between the color filters R, G, B and the liquid crystal is large and the contact is prolonged, color element leak from the filter layer to the side of the liquid crystal or interfere with each other, thereby deteriorating the performance.

SUMMARY OF THE INVENTION

The present invention aims to provide a liquid crystal device which overcomes aforementioned defects of the prior art and provides a color optical printer head which uses such liquid crystal as shutter arrays. In order to achieve such objects, the present invention is based upon the basic concept that color filter layers having uniform thickness are provided outside opposing transparent electrodes (glass substrate side) which are provided on both sides of the liquid crystal comprising individual optical shutters.

The optical printer head using liquid crystal shutter arrays according to the present invention is characterized in that a plural number of shutter arrays are provided to respectively correspond with colors, the plural transparent electrodes which are to be mounted on one of glass substrates are formed on the color filter layer of different resolution colors.

It is preferable that the color filter layer of the above mentioned structure is coated with a coating layer of transparent photosensitive resin on the following grounds:

(1) In order to make substantially uniform the distances between electrodes by smoothening out the difference in the thickness of color filters of different colors or the irregularities after lamination.

(2) In order to avoid the presence of a layer which has a specific inductive capacity different from that of liquid crystal materials between electrodes. Or in other words, substantially all of the impressed voltages should be added to the liquid crystal layer.

(3) In order to prevent the chemical interference between colored resin layer of the color filters and liquid crystal.

(4) In order to protect the color filter layers during the processes of forming transparent electrodes, etching, orientation process or adhering process of glass substrates, etc. in forming liquid crystal panels.

(5) For processing to expose the adhered portion of the glass substrates.

(6) In order to make the layer function as a protective layer which prevents unstable liquid crystal operations, defective contrast, or shortened life of a liquid crystal panel which might otherwise be caused by the contamination of the liquid crystal per se with minute amounts of water or alkali metal ions which mix with the materials of the color filter layers or the intermediate resin layer into the liquid crystal materials.

Aforementioned objects of this invention can be achieved in a desirable manner by forming color filter layers coated with a coating layer of transparent photosensitive resin and forming one of the transparent electrodes thereupon.

BRIEF DESCRIPTION OF THE DRAWINGS

FIG. 3 is a sectional view of the first preferrd embodiment,

FIG. 4 is a sectional view of the second embodiment,

FIG. 5 is a partial sectional view of the third embodiment and

FIG. 6 is a partial sectional view of the 4th embodiment shown.

DETAILED DESCRIPTION OF THE INVENTION

The present invention will now be described referring to preferred embodiments in more detail.

Figure 1A:
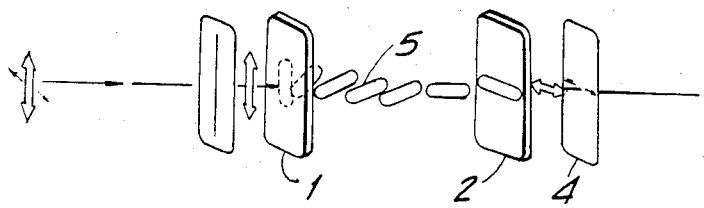
FIGS. 1(a) and (b) are views to explain the operational principle of a liquid crystal of TN method.
Figure 1B:
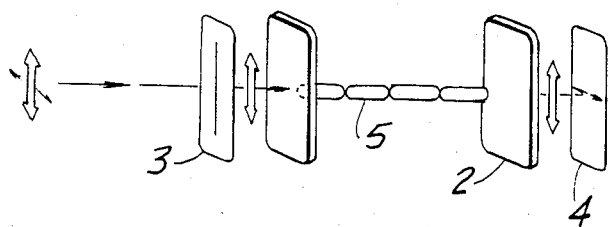
Figure 2:
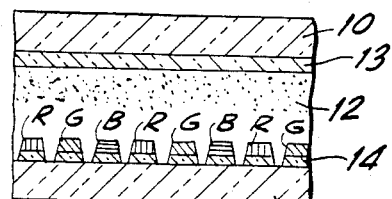
FIG. 2 is a sectional view of a prior art color liquid crystal element.
Figure 3:
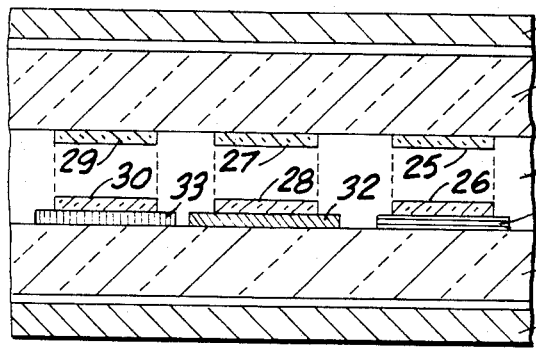
FIGS. 3 to 6 relate to the color liquid crystal device according to the present invention.

FIG. 3 shows the first embodiment of the color optical printer head using the liquid crystal device according to the present invention. As shown in the figure, a liquid crystal 20 is held and sealed between glass substrates 21, 22 which are provided with transparent electrodes 25, 26 in a plural number on inner surfaces thereof. On the outer surfaces of the glass substrates 21, 22 are mounted polarizing plates 23, 24 respectively. The thickness of the glass substrates 21, 22 is about 1 mm and the thickness of the liquid crystal is 10 to 20 $\mu$m. As described above, the liquid crystal 20 is of the TN type which has a rotary polarization property to rotate light by 90° when an electric field is impressed. The polarizing directions of the plates 23, 24 cross each other perpendicularly. Accordingly only a predetermined portion of the liquid crystal or the portion impressed by the predetermined voltage transmits light while the rest blocks light. On the inner surfaces of said glass substrates 21, 22 are arranged transparent electrodes 25, 26, 27, 28 and 29, 30 in a plural number of arrays of minute dots in a direction perpendicular to the paper surface. In other words, the transparent electrodes 25, 26 are opposed to each other with the liquid crystal 20 interposed therebetween on the glass substrates 21, 22 and transparent electrodes 25, 27, 29 are arranged on each glass substrate adjacently to each other at predetermined intervals. The size of such transparent electrodes 25, 26 is ca. 80 $\mu$m square and the pitch is ca. 100 $\mu$m. The material for the transparent electrodes 25, 26 is generally $In_2O_3$. Transparent electrodes 25, 26 are formed by vapor-depositing or sputtering $In_2O_3$ on glass substrates and the surface which contacts the liquid crystal is processed for orientation. As transparent electrodes 25, 26, 27, 28, 29, 30 are arranged in the form of arrays of minute dots, characters, figures or patterns can be displayed and printed arbitrarily.

Although in this embodiment, individual transparent electrodes corresponding to the shutter opening for a unit picture element are separately arranged in the manner of a dot-matrix, the liquid crystal shutter arrays may be of the type that at least either one of the transparent electrodes arranged on both sides of the liquid crystal or at least the upper electrode 13 or the lower electrode 14 in the figure is a common linear electrode and the portions where both electrodes are charged with a predetermined voltage (the portion where the electrodes 13 and 14 cross in a plane in the figure) functions as an optical shutter in operation.

Returning now to the explanation of the embodiment, color filters B, G, R, 31, 32, 33 are interposed between one of the glass substrates 22 (the lower glass substrate in the figure) and the transparent electrodes 26, 28, 30 in order to modify the device for color. The array provided with the color filters of B, G, R enables a color display or color print-out. It is preferable to form the color filters B, G, R slightly larger than the transparent electrodes 26, 28, 30 as shown in the figure so as to prevent the leakage of light sufficiently. The adjacent color filters B, G, R, may be extended to overlap each other to cover the whole surface of the glass substrates 22, thereby fully preventing the leakage of white light. As the color filters R, G, B are an additive color system, the overlapped portion becomes black optically.

Figure 4:
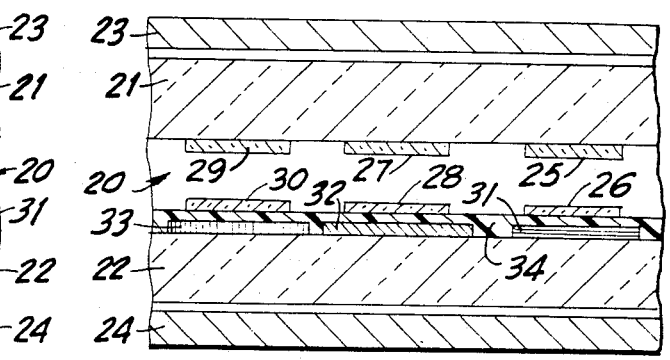

FIG. 4 shows the second embodiment of this invention.

Similar to the embodiment shown in FIG. 3, it comprises color filters B, G, R, 31, 32, 33 formed on glass substrate 22, and transparent electrodes 26, 28, 30 to drive the liquid crystal shutter array. This embodiment differs from the first one in that a coating layer 34 is formed between transparent electrodes 26, 28, 30 and the color filters 31, 32, 33. The coating layer 34 acts as a smoothing layer after the filters are formed. The coating layer 34 is provided for the purpose of making uniform the distance between opposing transparent electrodes, to stabilize the performance of the liquid crystal shutter, to prevent chemical interference between the liquid crystal material and the color filter material by preventing materials having a specific inductive capacity different from that of the crystal from existing between electrodes and to improve adhesion at the time of sputtering on the transparent electrodes. The layer is not colored and transparent to light, has solvent resistance in the etching process and cleaning process for transparent electrodes, and has a heat resistance in the deposition to glass in the subsequent process.

As the coating layer 34 has to be applied excluding the depositing portion on the glass substrates 21, 22, it is desirable to remove the coating from such portions by photo-etching to expose the glass portion for higher precision in shape and size. It is also desirable that the coating layer 34 has photosensitivity and a property optimal for photo-etching. Therefore, a desirable material for the coating layer 34 will be photosensitive resin as mentioned above. It is further preferable to use an organic resin layer which is not soluble in water to prevent interference between the liquid crystal material and the filter material, but is soluble in solvent used in the process to expose the deposited portion of the glass substrates and which has photo-hardening property and photo-sensitivity and is substantially transparent and not colored.

The color filter layers 31, 32, 33 are obtained by a dyeing process comprising exposing in pattern a resin layer of photo-hardening property such as gelatin bichromate to hardened necessary portions, removing un-hardend portions by dissolving the same with solvent, dyeing the hardened portions with dyes of blue, green and red to form the first colored resin layer, forming the intermediate resin layer to prevent color contamination (mixture) on the first colored resin layer, repeating such processes to meet the necessary conditions to finally form a coating layer on the surface. It may be formed by other methods such as the photocoloration method as disclosed in Japanese Patent Applications Laid-open under Sho No. 55-6342, Sho No. 56-75606, and Sho No. 56-91203.

Organic resins to form such coating layers in this invention may be, for instance, acrylic resin (e.g. polymethyl methacrylate, polyglycisil methacrylate, etc.) polycarbonate, polyurethane, polysulfone, poly cinnamic acid ester, poly cinnamic acid vinyl, polycyclic isoprene, polycyclic butadiene, copolymer stylene and butadine, polyester, polyamide, etc.

It is more preferable to use a photo-hardening polymer and especially polyester, polyamide and polycarbonate containing an unsaturated bond group which can be expressed as —CH=CR—CO— (wherein R denotes hydrogen atom, alkyl group, cyano group or allyl group). As an example of such organic resin is a soluble polycondensated compound which includes a photosensitive group in the aforementioned polymer main chain and bonded by ester bond, e.g. polyester of photosensitive type of p-phenylenediacrylic acid and diol, it is preferable to add an appropriate sensitizer to said resin in order to increase photo-sensitivity of the coating layer.

The color liquid crystal shutter array of the aforementioned structure of the first and second embodiments according to the present invention enables display and print-out of arbitrary characters and patterns in color and has the following advantageous features:

(A) As the color filters R, G, B are positioned underneath the transparent electrode 26, the distance between the transparent electrodes 25, 26 can be established uniformly. Thanks to that, the operational voltages can be made uniform for all colors to make display prints uniform.

(B) As electric fields are not impressed on the color filters R, B, G, electric fields are independent of the inductive capacity of respective filters, thereby enabling application of a uniform electric field on a liquid crystal.

(C) As transparent electrode 26 is provided on the color filters R, G, B, the color filters can be isolated from the liquid crystal 20, thereby avoiding chemical interference therebetween.

Figure 5:
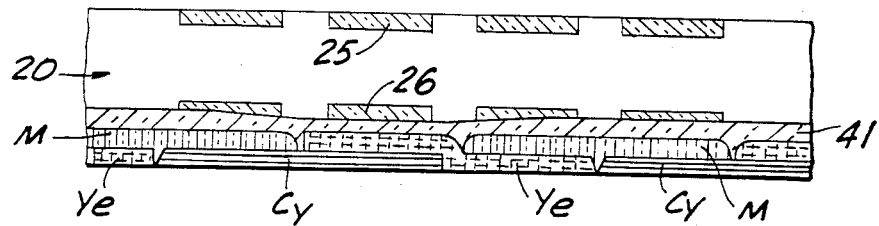

The third embodiment shown in FIG. 5 is now described. The embodiment shown in the figure uses a color filter layer of subtractive color mixture, is provided with a coating layer 41 which completely separates color filters from the liquid crystal and is flattened in the surface of the color filters by means of the coating layer 41. More particularly, glass substrates are provided on both sides of liquid crystal 20 and color filters Cy, M and Ye of color subtractive mixtures are respectively laminated on the inner surface of one of the glass substrates. The color filters Cy, M and Ye are arranged over the whole surface of the glass substrate in a manner to stagger by one half width so as to form two layers, i.e. an upper and a lower layer of color filter layers. The color filter Cy, M, Ye are cyan, magenta and yellow filters of color subtraction mixture. If two of them are overlapped, three primary colors of red, green and blue can be expressed. In other words, in the figure, if the upper and lower two layers of color filters consist of M and Cy, it corresponds to the filter of blue color, if it consists of Ye, Cy, it corresponds to the green filter and if it consists of Ye, M, it corresponds to the red filter.

Transparent coating layer 41 is formed all over the surface of the color filters M, Cy and Ye to flatten the same. Transparent electrodes 25, 26 are arranged in the form of arrays on the coating layer 41 and the other glass substrate in a manner to hold the liquid crystal therebetween.

The third embodiment of above construction has the same effect as described in the above mentioned embodiments as well as the following advantages:

(I) As the coating layer 41 flattens the surfaces of the laminations of the color filters M, Ye and Cy, the distance between opposing electrodes 25, 26 can be formed uniformly by a simple operation and the voltages impressed on the liquid crystal can be made uniform.

(II) As the color filters M, Ye and Cy are fully separated from the liquid crystal 20, chemical interference can be sufficiently avoided.

(III) As the color filters M, Ye, Cy cover completely the surface of the glass substrates, even if light leaks from the periphery of the electrodes, the leaked light should pass through one of the color filters, and therefore, white light can not be leaked. As the liquid crystal panel according to this invention can prevent leakage of white light, if it is used as a shutter for a liquid crystal printer head, it does not hamper the picture quality.

As described with respect to the second embodiment, it is preferable in manufacture if said coating layer is provided with a photosensitivity or photo-etching property because when the periphery of display elements are adhered together so as to seal the liquid crystal, the glass surface can be etched and exposed.

Figure 6:
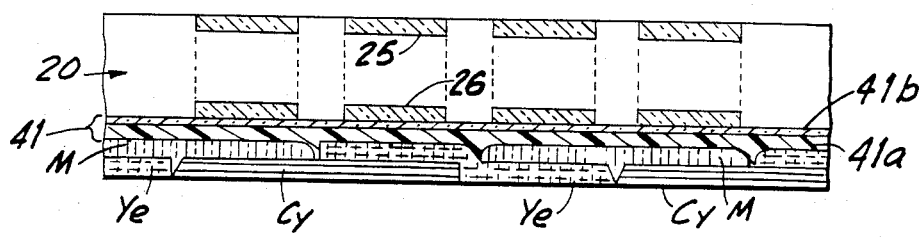

FIG. 6 shows the fourth embodiment which is a modification of the third embodiment (FIG. 5) wherein the coating layer 41 is formed in two layers; i.e. a coating layer 41a of photosensitive resin and a protecting layer 41b of transparent organic material or inorganic material which is newly provided. The fourth embodiment of such construction has the same effect as the aforementioned embodiments. In addition to the above, it can keep the liquid crystal material stable in its properties as the coating layer 41b can prevent the mixture of minute alkali metal ions which otherwise disperse from the coating layer 41a and filter layers M, Ye and Cy into the liquid crystal layer 20. The other coating layer 41a provided further underneath can smooth the irregularities in height on the upper surface of the filters, make uniform the distance between opposing electrodes 26, 25 at any location. The material for the coating layer may be for example phosphorous-silica glass, silicon nitride.

As described above referring to the embodiments, the printer head using the color liquid crystal device according to this invention is advantageous in that interference between color filters and the liquid crystal and disturbance in electric fields can be avoided and further the distance between electrodes can be set uniformly.

What I claim is:

1. A color optical printer head comprising: a liquid crystal, two glass substrates, said liquid crystal being sealed between said glass substrates, polarizing plates mounted on outer surfaces of said glass substrates, liquid crystal shutter arrays having plural transparent electrodes arranged in an opposing manner on said two glass substrates on the side contacting said liquid crystal, and color filter layers mounted at locations where transparent electrodes are formed to act as an optical shutter when a predetermined voltage is selectively applied between said opposing transparent electrodes, said color filter layers being of different colors corresponding to the colors to be resolved and being interposed between one of said glass substrates and the transparent electrodes on said one glass substrate.

2. A color optical printer head according to claim 1, wherein said color filter layer comprises colored resin layers or laminations thereof, and a transparent layer coating said layers or laminations so as to make the distance between opposing electrodes uniform over the whole surface of the shutter arrays.

3. A color optical printer head according to claim 2, wherein said transparent layer is a layer of photosensitive resin.

4. A color optical printer head according to claim 3, wherein said photosensitive resin layer is a photohardening resin and comprises a polymer including an unsaturated bond group which is expressed as —CH=CR—CO— (wherein R denotes hydrogen atom, alkyl group, cyano group, or allyl group).

5. A color optical printer head according to claim 4, wherein said polymer is selected from the group consisting of polyester, polyamide, and polycarbonate.

6. A color optical printer head according to claim 2, wherein photosensitive resin is located between the layers forming said color filters.

7. A color optical printer according to claim 6, wherein said photosensitive resin between the layers forming said color filter layers is the same photosensitive resin as said coating layer.

8. A color optical printer head according to claim 2, wherein said laminated colored resin layers are layers preventing color mixture.

9. A color optical printer head according to claim 2, wherein said coating layer includes a transparent layer which prevents alkali ions from entering the liquid crystal.

10. A color optical printer head comprising: a liquid crystal, two glass substrates, said liquid crystal being sealed between said glass substrates, polarizing plates mounted on outer surfaces of said glass substrates, liquid crystal shutter arrays having plural transparent electrodes arranged in an opposing manner on said two glass substrates on the side contacting said liquid crystal, and color filter layers mounted at locations where transparent electrodes are formed to act as an optical shutter when a predetermined voltage is selectively applied between said opposing transparent electrodes, said color filter layers being of different colors corresponding to the colors to be resolved and being interposed between one of said glass substrates and the transparent electrodes on said one glass substrate, said color filter layer comprising colored resin layers or laminations thereof, and a transparent layer coating said layers or laminations, so as to make the distance between opposing electrodes uniform over the whole surface of the shutter arrays, said transparent layer being a layer of photosensitive resin.

11. A color optical printer according to claim 10, wherein said photosensitive resin layer is a photohardening resin and comprises a polymer including an unsaturated bond group which is expressed as —CH—CR—CO— (wherein R denotes hydrogen atom, alkyl group, cyano group, or allyl group).

12. A color optical printer head according to claim 11, wherein said polymer is selected from the group consisting of polyester, polyamide, and polycarbonate.

13. A color optical printer head comprising: a liquid crystal, two glass substrates, said liquid crystal being sealed between said glass substrates, polarizing plates mounted on outer surfaces of said glass substrates, liquid crystal shutter arrays having plural transparent electrodes arranged in an opposing manner on said two glass substrates on the side contacting said liquid crystal, and color filter layers mounted at locations where transparent electrodes are formed to act as an optical shutter when a predetermined voltage is selectively applied between said opposing transparent electrodes, said color filter layers being of different colors corresponding to the colors to be resolved and being interposed between one of said glass substrates and the transparent electrodes on said one glass substrate, said color filter layer comprising colored resin layers or laminations thereof, and a transparent layer coating said layers or laminations, so as to make the distance between opposing electrodes uniform over the whole surface of the shutter arrays, photosensitive resin being located between the layers forming said color filter layers and being the same photosensitive resin as said transparent layer.

* * * * *